(12) United States Patent
Theurer et al.

(10) Patent No.: US 11,693,371 B2
(45) Date of Patent: Jul. 4, 2023

(54) POTENTIAL REPLACEMENT ALGORITHM SELECTION BASED ON ALGORITHM EXECUTION CONTEXT INFORMATION

(71) Applicant: General Electric Company, Schenectady, NY (US)

(72) Inventors: Charles Theurer, Alplaus, NY (US); Bradford Miller, Malta, NY (US); Kirk Lars Bruns, Waitsfield, VT (US); Vrinda Rajiv, Niskayuna, NY (US); Michael Kinstrey, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 973 days.

(21) Appl. No.: 15/922,092

(22) Filed: Mar. 15, 2018

(65) Prior Publication Data

US 2019/0286071 A1    Sep. 19, 2019

(51) Int. Cl.
| | |
|---|---|
| *G06N 20/00* | (2019.01) |
| *G05B 13/02* | (2006.01) |
| *G05B 1/01* | (2006.01) |
| *G06F 17/00* | (2019.01) |
| *G06F 11/34* | (2006.01) |

(52) U.S. Cl.
CPC ............. *G05B 13/026* (2013.01); *G05B 1/01* (2013.01); *G05B 13/021* (2013.01); *G05B 13/0265* (2013.01); *G06F 11/3447* (2013.01); *G06F 11/3457* (2013.01); *G06F 17/00* (2013.01); *G06N 20/00* (2019.01)

(58) Field of Classification Search
None
See application file for complete search history.

(56) References Cited

U.S. PATENT DOCUMENTS 6,587,829 B1    7/2003  Camarda et al.
10,943,301 B1   3/2021  Wu et al.
(Continued)

OTHER PUBLICATIONS

Compos, Marcos M. "Real-Time Scoring & Model Management 1—Life Cycle", Oracle Data Mining and Analytics, Feb. 21, 2006, http://oracledmt.blogspot.in/2006/02/real-time-scoring-model-management-1.html, (pp. 1-4, 4 total pages).
(Continued)

*Primary Examiner* — Craig C Dorais
(74) *Attorney, Agent, or Firm* — Hanley, Flight & Zimmerman, LLC

(57) ABSTRACT

According to some embodiments, an available algorithm data store may contain information about a pool of available algorithms. An algorithm selection platform coupled to the available algorithm data store may access the information about the pool of available algorithms and compare the information about each of the pool of available algorithms with at least one requirement associated with the current algorithm executing in the real environment. The algorithm selection platform may then automatically determine algorithm execution context information and, based on said comparison and the algorithm execution context information, select at least one of the pool of available algorithms as a potential replacement algorithm. An indication of the selected at least one potential replacement algorithm may then be transmitted (e.g., to be evaluated in a shadow environment by an algorithm evaluation platform).

21 Claims, 10 Drawing Sheets

(56) References Cited

U.S. PATENT DOCUMENTS

| | | | |
|---|---|---|---|
| 2007/0156557 A1 | 7/2007 | Shao et al. | |
| 2008/0046334 A1 | 2/2008 | Lee et al. | |
| 2009/0106178 A1* | 4/2009 | Chu | G06N 20/00 |
| | | | 706/14 |
| 2009/0112753 A1 | 4/2009 | Gupta et al. | |
| 2009/0299835 A1 | 12/2009 | Greenbaum et al. | |
| 2010/0223211 A1 | 9/2010 | Johnson et al. | |
| 2015/0142713 A1* | 5/2015 | Gopinathan | G06Q 40/00 |
| | | | 706/14 |
| 2017/0091673 A1 | 3/2017 | Gupta et al. | |
| 2017/0132548 A1 | 5/2017 | Majumder | |
| 2017/0193066 A1 | 7/2017 | Zhu et al. | |

OTHER PUBLICATIONS

Shyam, Varan Nath, Abstract "Champion-Challenger Based Predictive Model Selection", IEEE Proceedings Southeast Conference, http://ieeexplore.ieee.org/document/4147427/, Mar. 22-25, 2007, 1pg.

"The Seven Steps to Model Management", KNIME, https://www.knime.com/blog/the-seven-steps-to-model-management, Nov. 29, 2017, 4pgs.

"Delivering Improved Insights With Automated Analytics", Automated Analytics—Model Management Framework—Accenture, https://www.accenture.com/us-en/insight-improved-automated-analytics, downloaded Feb. 27, 2018, (pp. 1-4, 4 total pages).

Shukla, Vinay "Data Science for the Modern Data Architecture", Hortonworks, Sep. 20, 2017, https://hortonworks.com/blog/data-science-modern-data-architecture/, downloaded Feb. 27, 2018, (pp. 1-7, 7 total pages).

United States Patent and Trademark Office, "Final Office action," issued in connection with U.S. Appl. No. 15/953,639, dated Jun. 11, 2021, 32 pages.

United States Patent and Trademark Office, "Non-Final Office action," issued in connection with U.S. Appl. No. 15/953,639, dated Jan. 6, 2022, 34 pages.

SAS Institute Inc. 2011. SAS® Model Manager 12.1: User's Guide. Cary, "Challenger Models", retrieved from http://support.sas.com/documentation/cdl/en/mdsug/65072/HTML/defaul1/n0p646p8eku4ifn1sek4ygkndoj9.htm on Apr. 16, 2018, 44 pgs.

Young, "Performance Testing: Benchmarking Vs. Back-Testing", RiskSpan, Model and Data Governance, published on Nov. 17, 2016, retrieved from "https://www.riskspan.com/news-insight-blog/performance-testing-benchmarking-vs-back-testing" on Apr. 16, 2018, (32 total pages).

"IBM SPSS Modeler 18.1.1 Deployment Guide," IBM Online guidebook, 18.1.1, Jun. 17, 2018, 508 pages.

Predix Technical Whitepaper, "Predix Architecture and Services," GE Digital, Technical Whitepaper, Informational prouct guide, updated Nov. 28, 2016, 32 pages.

United States Patent and Trademark Office, "Non-final Office Action," issued in connection with U.S. Appl. No. 15/953,639, dated Feb. 22, 2021, 29 pages.

\* cited by examiner

POTENTIAL REPLACEMENT ALGORITHM SELECTION BASED ON ALGORITHM EXECUTION CONTEXT INFORMATION

BACKGROUND

Some embodiments disclosed herein relate to selection of an algorithm and, more particularly, to systems and methods to select a potential replacement algorithm based on algorithm execution context information.

An enterprise might use one or more algorithms to facilitate, for example, the use of an industrial asset. For example, a power company might use an algorithm to look for and/or predict problems with wind turbine blades. The enterprise might periodically look to improve the performance of such algorithms, such as by manually testing new algorithms to see if they operate better than existing ones (and, if so, replacing the existing algorithm with the improved version). Such an approach, however, can be a time consuming, expensive, and error prone task—especially when the algorithms are complex.

Moreover, different algorithms might perform differently under various operating conditions. For example, one algorithms might perform better during the day while another algorithm performs better at night. Realizing and using this information to select appropriate algorithms can be difficult. Than can be especially true when there a substantial number of algorithms (e.g., tens of thousands) that may need to be evaluated. It would therefore be desirable to provide systems and methods to efficiently and accurately facilitate selection of potential replacement algorithms.

SUMMARY

According to some embodiments, a system may include an available algorithm data store that contains information about a pool of available algorithms. An algorithm selection platform coupled to the available algorithm data store may access the information about the pool of available algorithms and compare the information about each of the pool of available algorithms with at least one requirement associated with the current algorithm executing in the real environment. The algorithm selection platform may then automatically determine algorithm execution context information and, based on said comparison and the algorithm execution context information, select at least one of the pool of available algorithms as a potential replacement algorithm. An indication of the selected at least one potential replacement algorithm may then be transmitted (e.g., to an algorithm evaluation platform).

Some embodiments comprise: means for accessing, by an algorithm selection platform, information about a pool of available algorithms from an available algorithm data store; means for comparing the information about each of the pool of available algorithms with at least one requirement associated with a current algorithm executing in a real environment; means for automatically determining algorithm execution context information; based on said comparison and the algorithm execution context information, means for selecting at least one of the pool of available algorithms as a potential replacement algorithm; and means for transmitting an indication of the selected at least one potential replacement algorithm.

Technical effects of some embodiments of the invention may include improved and computerized ways to efficiently and accurately facilitate selection of potential replacement algorithms. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
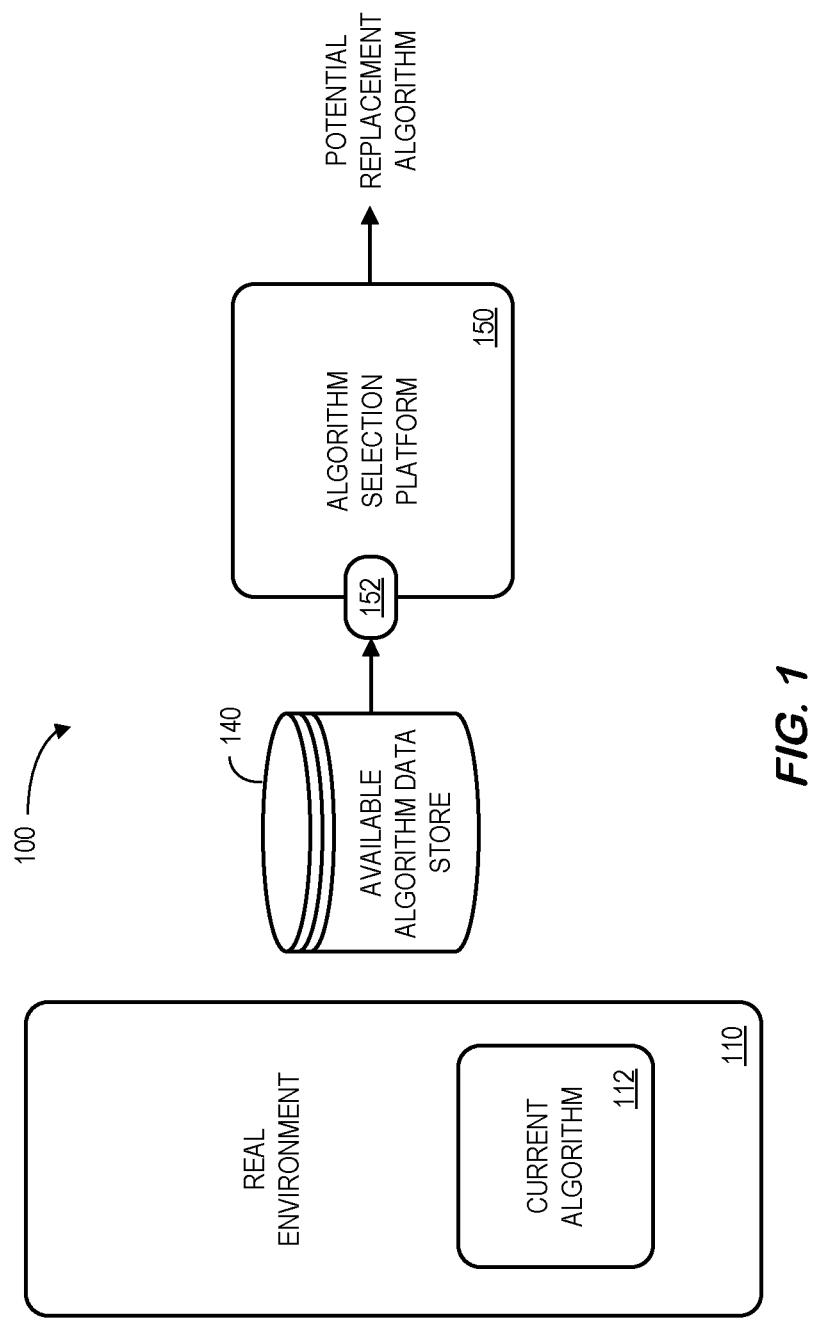
FIG. 1 is a high-level block diagram of a system according to some embodiments.

It may generally be desirable to efficiently and accurately facilitate selection of potential replacement "algorithms" associated with a current algorithm executing in a real environment (e.g., a solar farm, turbine, factory, aircraft, etc.). As used herein, the term "algorithm" might refer to any application, program, formula, etc. that facilitates operation of an industrial asset. FIG. 1 is a high-level block diagram of a system 100 associated with a current algorithm executing in a real environment (e.g., a factory, wind turbine, jet engine, dam, etc.) according to some embodiments. In particular, the system 100 includes an algorithm selection platform 150 with a communication port 152 to access information in an available algorithm data store 140.

According to some embodiments, the available algorithm data store 140 stores electronic records containing, for example, a catalog with metadata about a pool of available algorithms that could potentially replace the current algorithm 112. According to some embodiments, the algorithm selection platform 150 and/or other elements of the system may then determine which of those algorithms should be evaluated and compared to the current algorithm 112. Note that the algorithm selection platform 150 could be completely de-centralized, cloud-based, and/or might be associated with a third party, such as a vendor that performs a service for an enterprise.

The algorithm selection platform 150 might be, for example, associated with a Personal Computer ("PC"), laptop computer, a tablet computer, a smartphone, an enterprise server, a server farm, and/or a database or similar storage devices. According to some embodiments, an "automated" algorithm selection platform 150 may automatically select potential replacement algorithms. As used herein, the term "automated" may refer to, for example, actions that can be performed with little (or no) intervention by a human.

As used herein, devices, including those associated with the algorithm selection platform 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The algorithm selection platform 150 may store information into and/or retrieve information from data stores. The data stores might, for example, store electronic records representing historical data, existing algorithms, components that might be combined to create an algorithm, etc. The data stores may be locally stored or reside remote from the algorithm selection platform 150. Although a single algorithm selection platform 150 is shown in FIG. 1, any number of such devices may be included. Moreover, various devices described herein might be combined according to embodiments of the present invention. In some embodiments, the algorithm selection platform 150, available algorithm data store 140, and/or other devices might be co-located and/or may comprise a single apparatus. For example, the algorithm selection platform 150 might be associated with a single network cloud-hosted topology, a multiple network cloud-hosted topology, a participant hosted intranet environment, etc.

Figure 2:
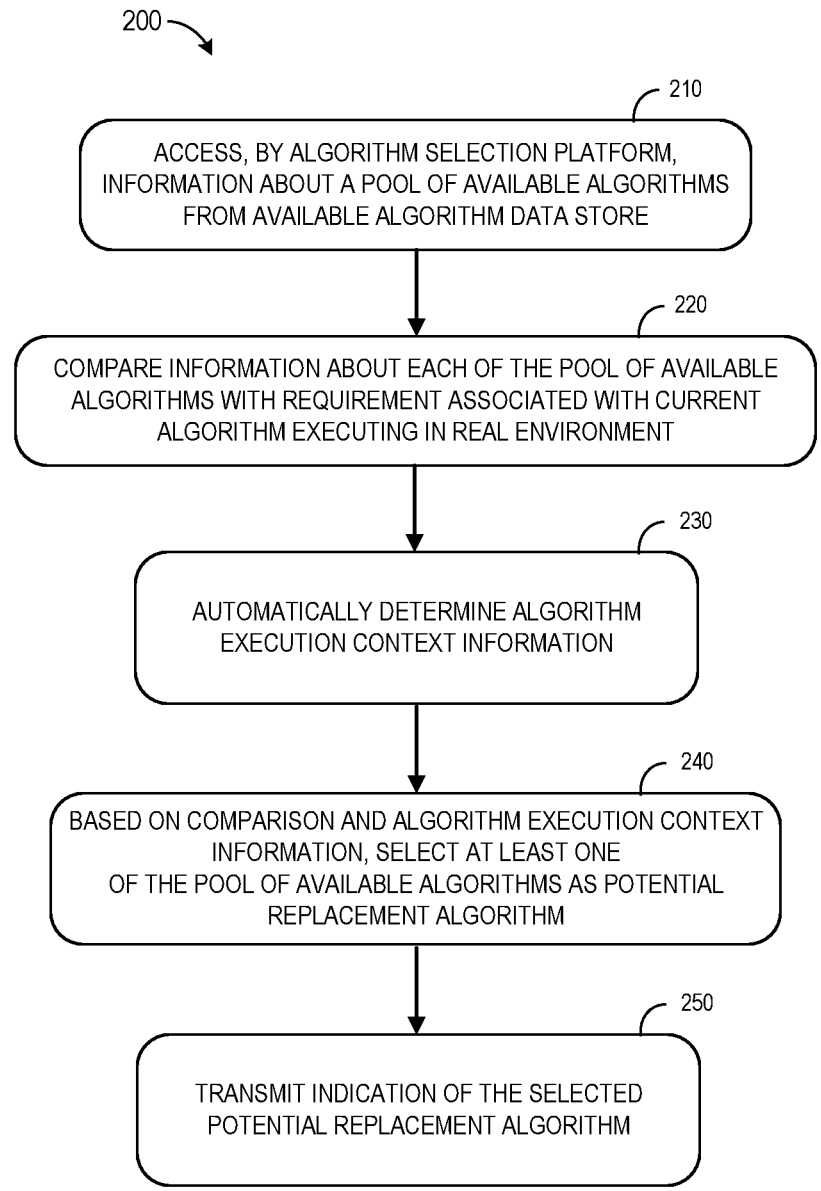
FIG. 2 is a method to facilitate selection of potential replacement algorithms in accordance with some embodiments.

In this way, the system 100 may efficiently and accurately facilitate selection of potential replacement algorithms. For example, FIG. 2 is a method 200 associated with a current algorithm executing in a real environment in accordance with some embodiments. The flow charts described herein do not imply a fixed order to the steps, and embodiments of the present invention may be practiced in any practicable order. Note that any of the methods described herein may be performed by hardware, software, or any combination of these approaches. For example, a computer-readable storage medium may store thereon instructions that when executed by a machine result in performance according to any of the embodiments described herein.

At 210, an algorithm selection platform may access information about a pool of available algorithms from an available algorithm data store. The available algorithm data store might include metadata associated with a catalog of potential algorithms, including an algorithm identifier, a description of the algorithm, an implementation type (e.g., source code, executable, data, etc.), and/or a software version number. The algorithm metadata might also include, for example, input data (e.g., the type and format of the input data), output data (e.g., the type and format of the output data), and/or a resource requirement (e.g., an amount of memory, computing resources, sensor types, etc. needed to support the algorithm). Other examples of algorithm metadata include context information, historical performance data (e.g., "this algorithm was replaced by a better algorithm on Jan. 1, 2020"), an author (e.g., a person, enterprise, or program that created the algorithms), compliance information (e.g., indicating that the algorithm meets safety standards, governmental regulations, etc.), license information (e.g., indicating that the algorithm is license free, that a license was purchased until an expiration data, etc.).

At 220, the system may compare the information about each of the pool of available algorithms with at least one requirement associated with the current algorithm executing in the real environment. For example, the at least one requirement associated with the current algorithm executing in the real environment might include an input type and/or an input format (e.g., algorithm needs to accept a video input stream). Similarly, the requirement might include an output type and/or an output format (e.g. the algorithm must generate a probability of failure from 0 to 100%). As still another example, the requirement might represent a resource requirement (e.g., the algorithm requires a processor capable of performing a pre-determined number of operations per second).

At 230, the system may automatically determine algorithm execution "context" information. As used herein, the term "context" might refer to any parameter, condition, state, etc. that effects operation of an algorithm. By ways of examples only, context might be associated with a geographic location, a weather condition, a time of day, another algorithm, a cloud edge environment, historical data, and/or specific hardware. In some cases, the context information might be based on a priori information, such as the knowledge of an expert in the field. In other cases, the context information might be based on a deep learning model (e.g., when a large amount of data is available) and/or a sparse learning technique (e.g., utilizing a graph). Note that context information could be associated with a directly measured value, an inferred value, a genetic algorithm (e.g., with various mutations being compared), etc. According to some embodiments multiple types of algorithm execution context information might be determined. For example, one algorithm might be particularly effective in the daytime when the temperature is over 95° F. Note that the term context may also refer to any possible "hidden parameter" (i.e., something that affects the operation of, or result of, an algorithm but is not, usually, an explicit parameter). Typically, "context" may be an assumption inside a programmer's head in the sense that they only thought about running the algorithm under certain conditions. Later, it might be determined in the field that there are other conditions the programmer didn't think of (so it's not a parameter or even part of the developer documentation). For example, a system might achieve higher accuracy when the temperature is over 0° C. (when the developer implicitly assumed it would always be run at room temperature and therefore didn't consider possible sensitivity to the ambient temperature).

Based on the comparison and the algorithm execution context information, at 240 the system may select at least one of the pool of available algorithms as a potential replacement algorithm. For example, some algorithms will not be appropriate to replace the current algorithm (e.g., because they generate the wrong type of output or need computing resources that are not available in the real environment).

At 250, the system may transmit an indication of the selected at least one potential replacement algorithm. For example, the indication of a selected potential replacement algorithm might be transmitted to an algorithm evaluation platform. The algorithm evaluation platform may then arrange for the at least one potential replacement algorithm to execute in a shadow environment. Note that execution in the shadow environment might be based on historical data associated with the real environment or a substantially real-time stream of information from the real environment. The algorithm evaluation platform may then compare performance of the at least one potential replacement algorithm with performance of the current algorithm in the real environment (e.g., based on an accuracy, a precision, a level of confidence, etc.). When the performance of a potential replacement algorithm exceeds performance of the current algorithm in the real environment, the system may arrange for that potential replacement algorithm to become the current algorithm.

Figure 3:
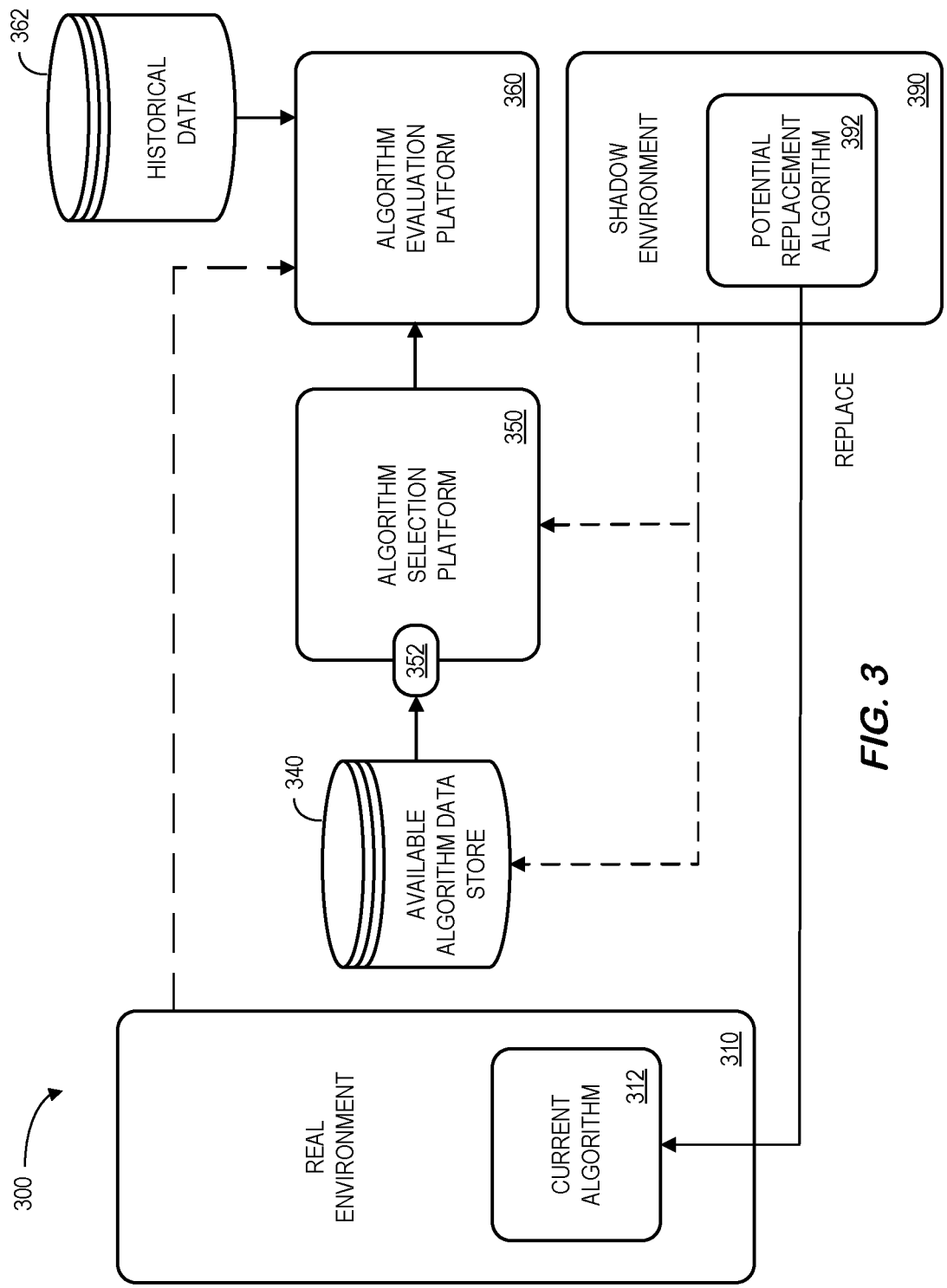
FIG. 3 is a more detailed block diagram of a system according to some embodiments.

FIG. 3 is a more detailed block diagram of a system 300 associated with a current algorithm 312 executing in a real environment 310 according to some embodiments. As before, the system 300 includes an algorithm selection platform 350 with a communication port 352 to access information in an available algorithm data store 340.

According to some embodiments, the available algorithm data store 340 stores electronic records containing, for example, a catalog with metadata about a pool of available algorithms that could potentially replace the current algorithm 312. According to some embodiments, the algorithm selection platform 350 and/or other elements of the system may then determine which of those algorithms should be evaluated and compared to the current algorithm 312. The system 300 further includes an algorithm evaluation platform 360 that arranges for one or more potential replacement algorithms 392 to safely execute in a shadow environment 390 (such that the real environment 310 is not impacted by the evaluation). The shadow environment 390 might utilize, for example, historical data 362 or a stream of substantially real-time data from the real environment 310. If the performance of the potential replacement algorithm 392 exceeds that of the current algorithm 312, the system 300 may replace the current algorithm 312 and thus improve future performance in the real environment 310. Information about evaluations (including poor results) can also be fed back into the available algorithm data store 340 and/or the algorithm selection platform 350 to improve future selections.

Figure 4:
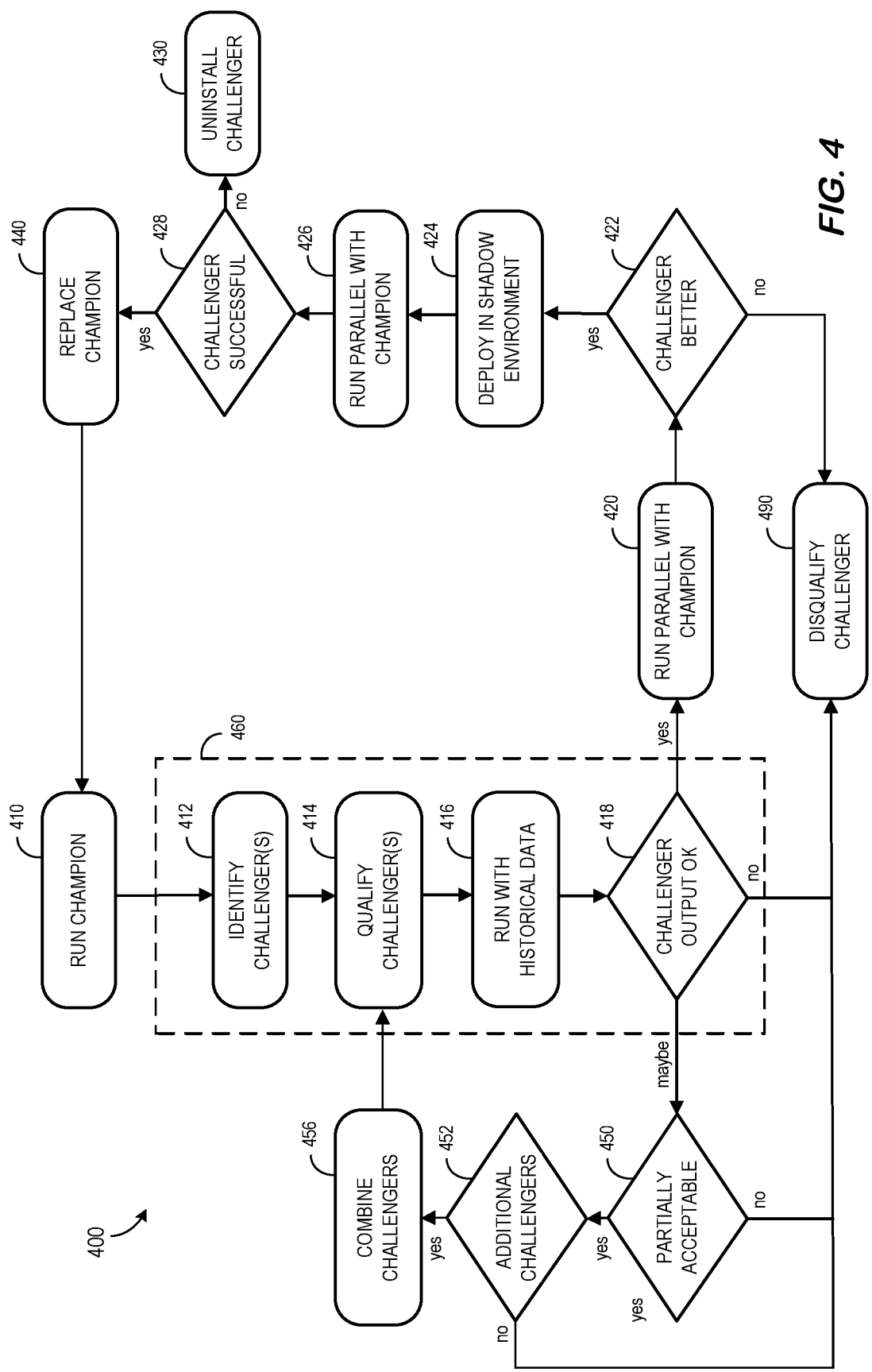
FIG. 4 is a champion/challenger process flow according to some embodiments.

FIG. 4 is a champion/challenger process flow 400 according to some embodiments. Initially, the system may run or execute a current algorithm or "champion" at 410. The system may then identify one or more potential replacement algorithms or "challengers" at 412 and determine if they are qualified at 414 (e.g., create an appropriate output). The system may then run the algorithm with historical data at 416. If the results of the algorithm with historical data are not acceptable at 418, the challenger is disqualified at 490 (that is, the algorithm cannot replace the champion).

If the results of the algorithm with historical data are acceptable at 418, the challenger is run in parallel with the champion at 420. For example, the challenger might be run in a shadow environment to provide a "safe" execution such that it cannot introduce any side effects into the real environment (e.g., computer viruses, malfunctions, etc.). Optionally, embodiments might simulate what the state of the system would have been had it based any decisions affecting the environment on the output of the challenger. If the challenger does not outperform the champion at 422, it is disqualified at 490. If the challenger does outperform the champion at 422, it is deployed in a shadow environment at 424 for further evaluation and run in parallel with the champion in the real environment at 426. If the challenger is not successful at 428, it is uninstalled at 430 and the champion remains the current algorithm. If the challenger is successful at 428, it replaces the champion at 440 and the process continues at 410.

In some cases, the result of a challenger's performance at 418 might be "borderline" (that is, the results might be interesting but not exactly right to replace the champion). As a result, if the output is not at least partially acceptable at 450, the challenger is disqualified at 490. If the output is at least partially acceptable at 450, the system may search for additional algorithms to enhance or otherwise adjust the challenger at 452. If no additional algorithms are identified at 452, the challenger is disqualified at 490.

Figure 5:
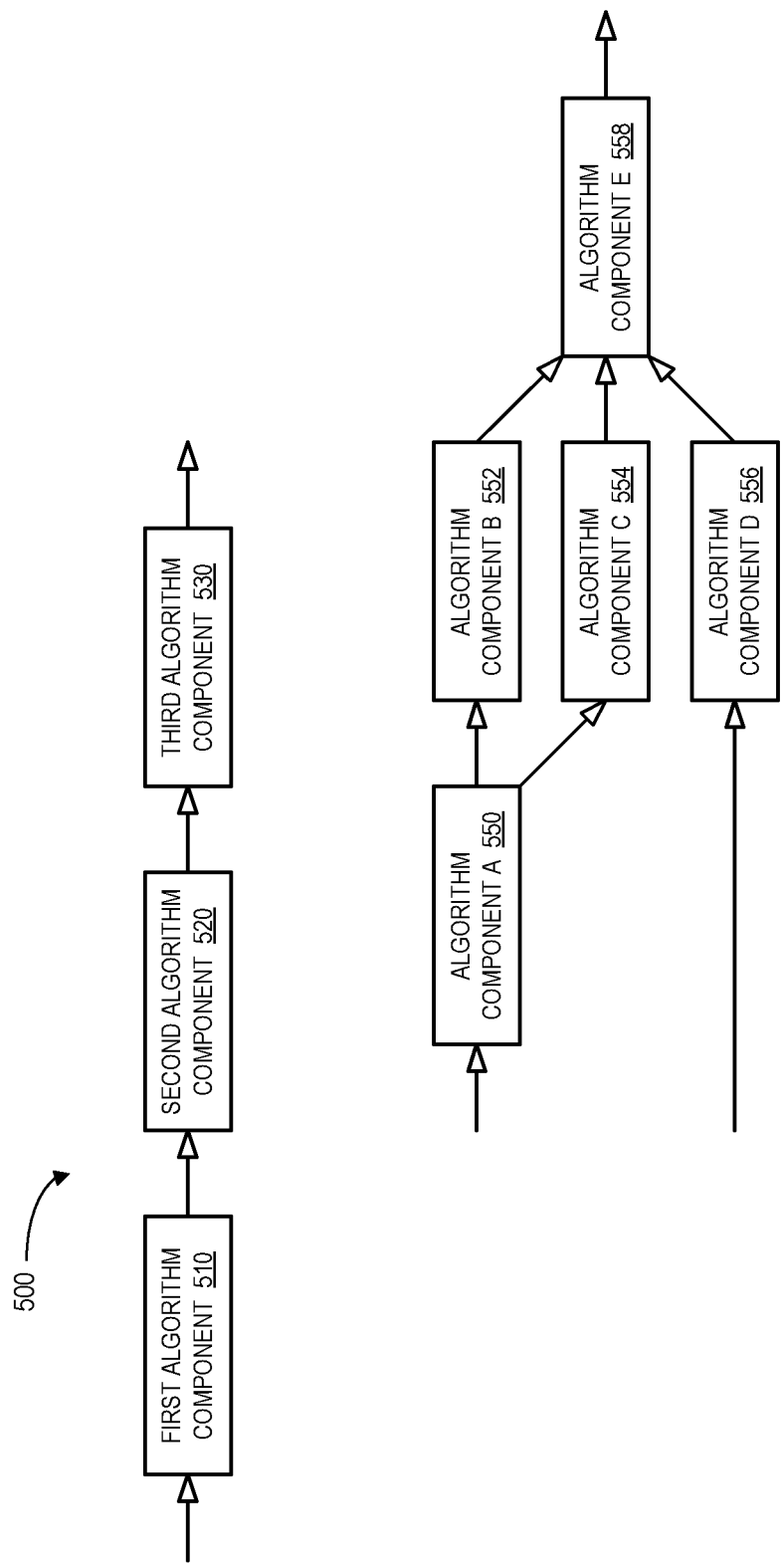
FIG. 5 illustrates the hybridization and/or compositing of algorithm components in accordance with some embodiments.

If additional algorithms are identified at 452, the system may attempt to combine the algorithm at 456 (to create a new hybridized or composite algorithm). This new algorithm can then be qualified at 414. Thus, according to some embodiments, a plurality of algorithm components may be automatically combined to create a potential replacement algorithm. Note that the combination might be based at least in part on algorithm execution context information. FIG. 5 illustrates 500 the hybridization and/or compositing of algorithm components in accordance with some embodiments. In a first example, the output of a first algorithm component 510 is used as an input for a second algorithm component 520. Similarly, the output of the second algorithm component 520 is used as an input of a third algorithm component 530. In this way, algorithms may be automatically "chained" together to perform a series of tasks. Note that more complicated assemblies may be provided. In a second example, the output of algorithm component A 550 is provided to both algorithm component B 552 and algorithm component C 554. Algorithm component E 558 combines the output of those two components 552, 554 along with an output of algorithm component D 556 to create the overall algorithm's output. Note that an existing champion algorithm might be part of a new hybridized algorithm. For example, consider a champion algorithm that performs well during the day (but not a night) and a challenger algorithm that performs well at night (but not during the day). In this case, the system may hybridize a new algorithm that uses the champion algorithm during the day and the challenger algorithm at night.

Figure 6:
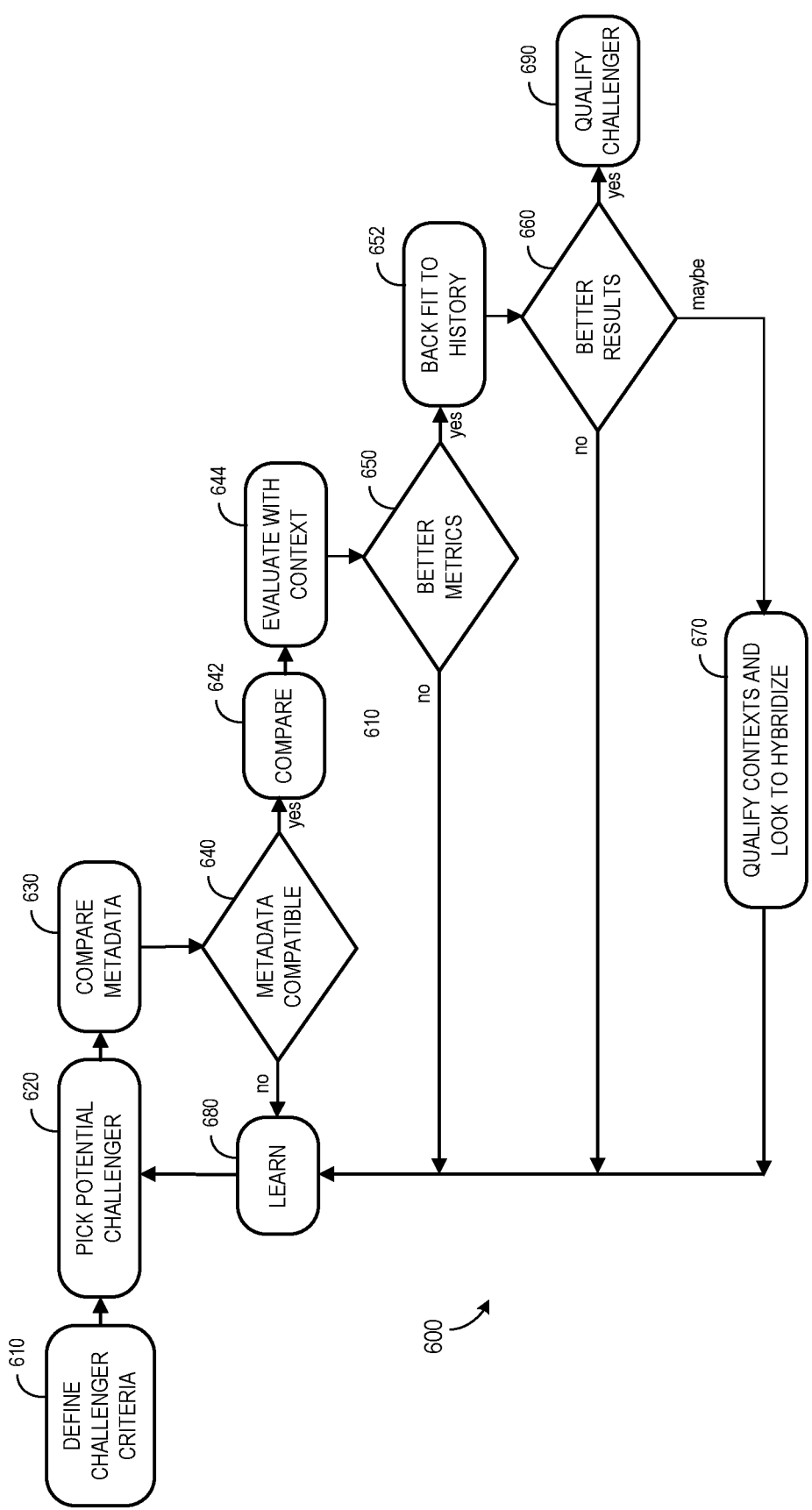
FIG. 6 is a challenger selection process flow according to some embodiments.

Referring again to FIG. 4, portion 460 of the process flow 400 (illustrated by a dashed box in FIG. 4) represents a "challenger selection method" in accordance with some embodiments. FIG. 6 is a more detailed challenger selection process flow 600 according to some embodiments. At 610, challenger metadata may be defined and potential challengers may be picked at 620 (by selecting the potential challengers from a catalog of pre-defined algorithms). The metadata is then compared at 630 and if not compatible at 640 the system notes the mis-match (that is "learns" from the mistake, e.g., discovering an important piece of metadata that should be considered) at 680 and a new potential challenger is selected at 620 as the process continues.

If the metadata was compatible at 640, the accuracy, precision, confidence lever, etc. of the potential challenger is considered 642 and the algorithm is evaluated with learned context at 644. If better metrics are not achieved at 650, the system learns at 680 and a new potential challenger is selected at 620. If better metrics are achieved at 650, the system back fits to champion historical data at 652. If better results are achieved at 660, the challenger is qualified at 690. If better results are not achieved at 660, the system learns at 680 and a new potential challenger is selected at 630. If the results are interesting (but not sufficient to qualify the challenger) at 660, the system may attempt to qualify contexts and/or look to hybridize the potential challenger with other algorithms at 670.

Thus, some embodiments may divide a particular process into parts, steps or particular actions, each of which is represented by some code (e.g., controllers, analytics, etc.). Each of these may be labeled with metadata describing the general problem or function they have (e.g., perception and classification of spalls on turbine blades might be generally a spall-detector), the specific input requirements, resource requirements and output characterization (e.g., Red-Green-Blue ("RGB") camera, 2 GiB memory, 120 GFIO (billions of floating point operations), predicate (will return a "yes" or "no" result), confidence (will express confidence in a range of $0_|000$), etc. These are used as selection criteria by a particular system when it wants to update or replace an existing function. Note that the system may specifically filter using this metadata based on the available resources and timeline to ensure that the challenger has the potential for successful replacement or improvement of the current solution. Mismatches may either disqualify a challenger or force a planner/scheduler to create a chain of functions (inferring the requirements and performance for the chain based on metadata) to see if it is competitive. For example, if the existing champion is a predicate indicating a spall, and a potential challenger is a function that indicates the degree of spall damage, then a thresholding function might be added to allow the function to correctly replace the existing predicate. The resources needed to run such a function might then be added to the footprint of the challenger.

The metadata, based on prior experience with the function, may include dynamic technical data about catalog challengers and champions (e.g., precision of the result, accuracy, and the precision and accuracy of its own measure of these values). This information can be used to determine if a challenger properly outperforms the champion (that is all measures are equal or better) or is a partial solution (whose appropriateness may be context dependent). According to some embodiments, some measurements are performed with respect to a particular context (e.g. the best "cat" detector may work well when the environment is well lit and clear blue skies, but on overcast days one that does not work as well on clear days may exceed the performance of the champion). Being able to classify performance by context, and not requiring all contexts to be identified a priori, may lead to better results. According to some embodiments, the system may determine what is different about the current context when performance of a particular challenger or champion differs from historic medians, and it is that identification (which might be determined using reinforcement learning) that helps the system eventually learn new labels for such algorithms. This new information can then be added to the metadata which can then be used as part of the matching criteria.

Rather than simply designating a particular asset as "an improvement," some embodiments allow the introduction of specific situational contexts that can be learned to classify when the asset is better. That is, the system may learn more about the world through identifying these situations without any a priori knowledge of situation classification. As a result, the matching of assets to those that are likely to be better for a situation at hand (as well as the computational and other resource constraints of the using device) may be improved. Over time, the system may hybridize assets to make sure they not only can be used by the asset to solve the same problem as a prior champion, but can also over time change the architecture through simplification of the analytic chain to take advantage of higher degrees of output dimensionality. For example, when a predicate is currently used, the system may substitute another function and turn it into a predicate, and may perhaps eventually learn to use the functional output without thresholding.

Figure 7:
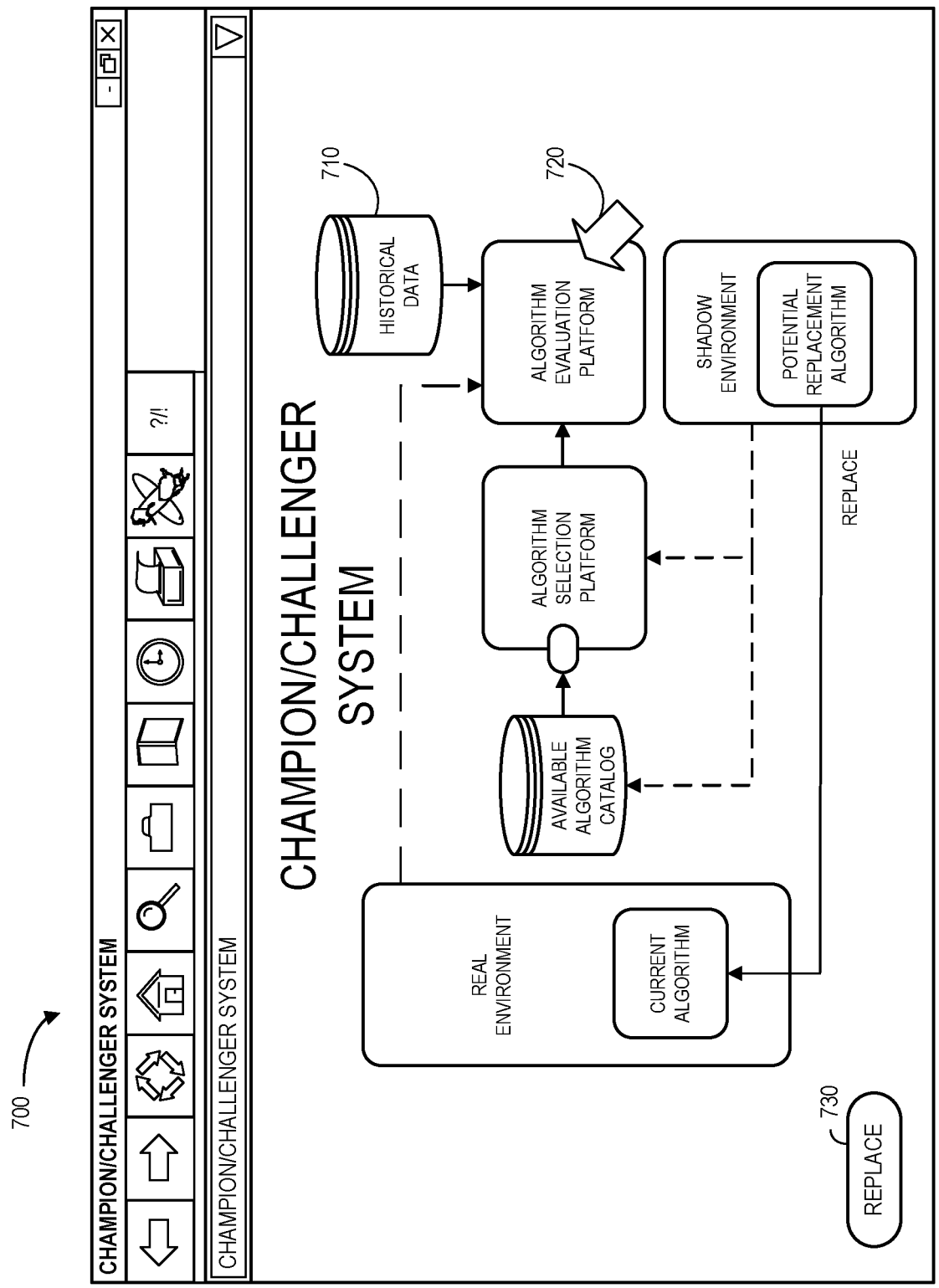
FIG. 7 illustrates a computer display in accordance with some embodiments.

In some cases, a display may provide information to an operator or administrator and/or allow him or her to make adjustments to the system. For example, FIG. 7 illustrates a champion/challenger display 700 that might utilize an interactive graphical user interface. The display 700 might comprise a graphical overview 710 of a champion/challenger system including a real environment, an algorithm selection platform, an available algorithm catalog, an algorithm evaluation platform, etc. Selection of an element on the display 700 (e.g., via a touch screen or computer mouse pointer 720) might result in further information about that element being presented (e.g., in a pop-up window) and, in some cases, allow for an adjustment to be made in connection with that element. In addition, selection of a "Replace" icon 730 might trigger movement of a potential replacement algorithm to the real environment.

Figure 8:
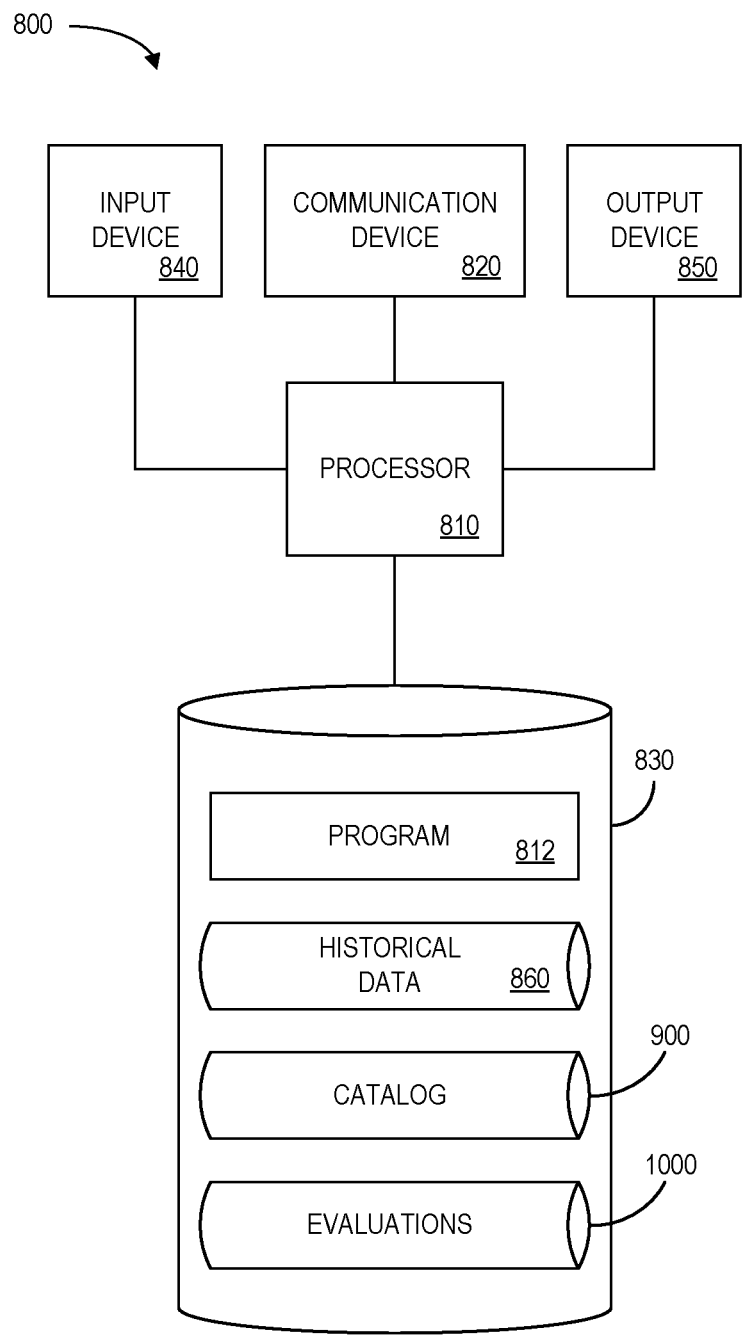
FIG. 8 illustrates a platform according to some embodiments.

Embodiments described herein may comprise a tool that facilitates selection of potential replacement algorithms and may be implemented using any number of different hardware configurations. For example, FIG. 8 illustrates a platform 800 that may be, for example, associated with the systems 100, 300 of FIGS. 1 and 3, respectively (as well as other systems described herein). The platform 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more administrators, catalogs, etc. Note that communications exchanged via the communication device 820 may utilize security features, such as those between a public internet user and an internal network of an insurance enterprise. The security features might be associated with, for example, web servers, firewalls, and/or PCI infrastructure. The platform 800 further includes an input device 840 (e.g., a mouse and/or keyboard to enter information about algorithms, environments, etc.) and an output device 850 (e.g., to output status reports, generate alert messages, etc.).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 812 and/or network security service tool or application for controlling the processor 810. The processor 810 performs instructions of the program 812, and thereby operates in accordance with any of the embodiments described herein. For example, the processor 810 may access information about a pool of available algorithms and compare the information about each of the pool of available algorithms with at least one requirement associated with a current algorithm executing in a real environment. The processor 810 may then automatically determine algorithm execution context information and, based on said comparison and the algorithm execution context information, select at least one of the pool of available algorithms as a potential replacement algorithm. An indication of the selected at least one potential replacement algorithm may then be transmitted by the processor 810 (e.g., to an algorithm evaluation platform).

The program 812 may be stored in a compressed, uncompiled and/or encrypted format. The program 812 may furthermore include other program elements, such as an operating system, a database management system, and/or device drivers used by the processor 810 to interface with peripheral devices.

As used herein, information may be "received" by or "transmitted" to, for example: (i) the platform 800 from another device; or (ii) a software application or module within the platform 800 from another software application, module, or any other source.

In some embodiments (such as shown in FIG. 8), the storage device 830 further stores historical data 860 (e.g., information generated by prior algorithms executing in real environments), a catalog 900, and evaluations 1000. Example of databases that might be used in connection with the platform 800 will now be described in detail with respect to FIGS. 9 and 10. Note that the databases described herein are only examples, and additional and/or different information may be stored therein. Moreover, various databases might be split or combined in accordance with any of the embodiments described herein. For example, the historical data 860 and catalog 900 might be combined and/or linked to each other within the program 812.

Figure 9:
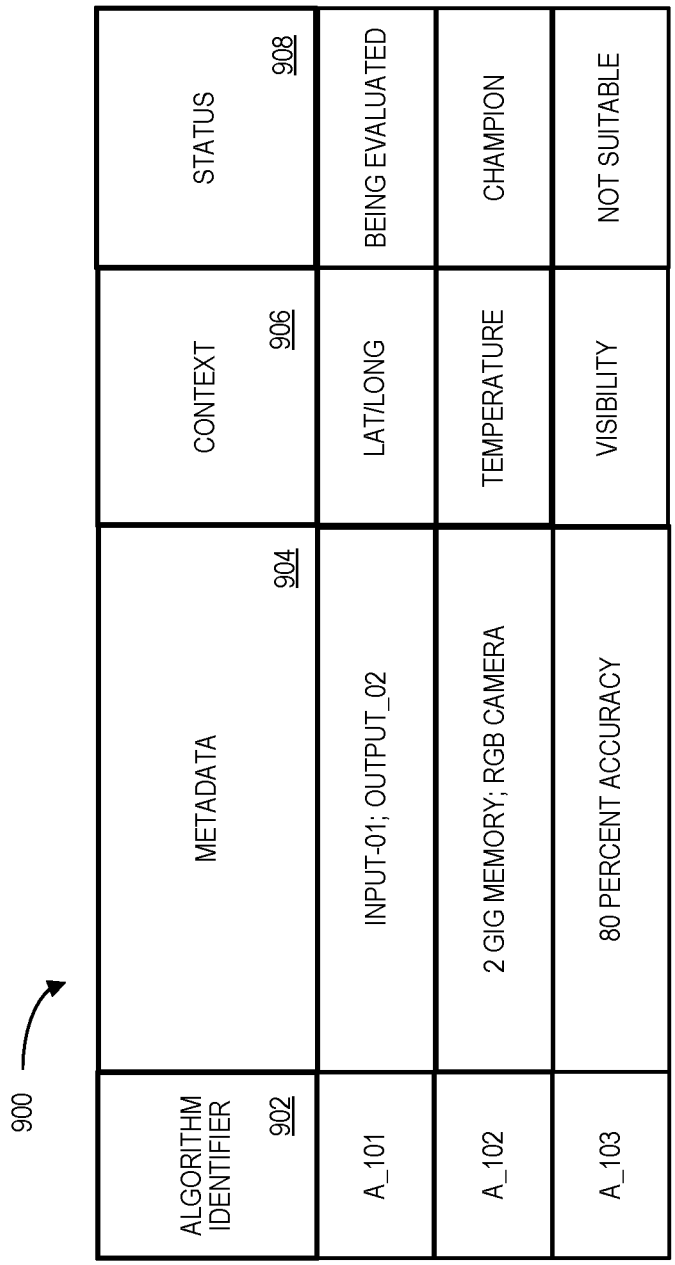
FIG. 9 is a portion of a tabular catalog data store in accordance with some embodiments.

Referring to FIG. 9, a table is shown that represents the catalog 900 that may be stored at the platform 800 in accordance with some embodiments. The table may include, for example, entries identifying algorithms that are available to be incorporated into a real environment. The table may also define fields 902, 904, 906, 908 for each of the entries. The fields 902, 904, 906, 908, 914 may, according to some embodiments, specify: an algorithm identifier 902, metadata 904, context 906, and a status 908. The catalog 900 may be created and updated, for example, when new algorithms are added to a system, results of evaluations are received, etc.

The algorithm identifier 902 may be, for example, a unique alphanumeric code identifying code, formula, applications, etc. that might be executed in a real or shadow environment. The metadata 904 might be any information that describes the algorithm, including, for example, inputs, outputs, resource requirements, performance metrics, etc. The context 906 might indicate any condition that impacts operation of the algorithm (e.g., time of day, weather, location, etc.). The status 908 might indicate if the algorithm is currently the champion, is being evaluated, is not suitable to replace a current algorithm, etc.

Figure 10:
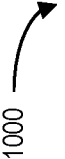
FIG. 10 is a portion of a tabular evaluation data store according to some embodiments.

Referring to FIG. 10, a table is shown that represents the evaluations 1000 that may be stored at the platform 800 in accordance with some embodiments. The table may include, for example, entries identifying algorithms that have been evaluated by an algorithms evaluation platform. The table may also define fields 1002, 1004, 1006, 1008, 1010, 1012, 1014 for each of the entries. The fields 1002, 1004, 1006, 1008, 1010, 1012, 1014 may, according to some embodiments, specify: an algorithm identifier 1002, an evaluation 1004, a date and time 1006, a qualified indication 1008, an accuracy 1010, a precision 1012, and a variance 1014. The evaluations 1000 may be created and updated, for example, as algorithms are evaluated as potential challengers to a current champion.

The algorithm identifier 1002 may be, for example, a unique alphanumeric code identifying code, formula, applications, etc. that might be executed in a real or shadow environment and might be based on or associated with the algorithm identifiers 902 stored in the catalog 900. The evaluation 1004 might describe how the evaluation was (or will be performed), such as by using historical data, which environment was used during the test, etc. The date and time 1006 might indicate when the evaluation was performed. The qualified indication 1008 might reflect that evaluation results are pending, the algorithm is not qualified to be a challenger, etc. The evaluations 1000 may also store results of the evaluations such as the accuracy 1010, the precision 1012, the variance 1014, etc.

Thus, some embodiments described herein may have a technical advantage because the system is able to qualify a challenger algorithm or application that can replace an existing champion. According to some embodiments, the system may learn the "right question" to ask and learn "what is important about the world?" that makes a difference. The system may also use learning from the context to pick the right challenger (for that context), and use the context to help determine what makes the algorithm work (better) in that situation.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information described herein may be combined or stored in external or cloud-based systems).

Some embodiments have been described with respect to information associated with an "industrial asset," which might include, for example, sensors, actuators, controllers, financial institutions, military devices, etc. Moreover, note that embodiments described herein might be associated with cyber-security systems that monitors one or more industrial assets, power generation, Unmanned Aerial Vehicle ("UAV") fleets, propulsion, healthcare scanners, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a real environment executing a current algorithm, the system comprising:

an available algorithm data store containing information about a set of available algorithms; and an algorithm selection platform coupled to the available algorithm data store, algorithm selection platform including:
  a data connection to access the information about the set of available algorithms; and
  at least one selection computer processor coupled to the data connection to:
    process the current algorithm executing in the real environment to identify one or more parts of the current algorithm;
    label each of the one or more parts with metadata describing a function of the respective part;
    define, based on an analysis of the metadata associated with the current algorithm executing in the real environment, at least one selection criterion for selection of at least one of the set of available algorithms;
    filter the set of available algorithms into a subset of available algorithms using the at least one selection criterion;
    determine a context for algorithm execution, the context characterized by algorithm execution context information;
    measure and evaluate each of the subset of available algorithms with respect to the context and the metadata to select at least one of the subset of available algorithms as a potential replacement algorithm; and
    transmit an indication of the selected at least one potential replacement algorithm.

2. The system of claim 1, further comprising:
an algorithm evaluation platform coupled to the algorithm selection platform and adapted to:
  receive the indication of the at least one potential replacement algorithm,
  arrange for the at least one potential replacement algorithm to execute in a shadow environment, and
  compare performance of the at least one potential replacement algorithm with performance of the current algorithm in the real environment.

3. The system of claim 2, wherein the algorithm evaluation platform is further adapted to:
  when the performance of a potential replacement algorithm exceeds performance of the current algorithm in the real environment, arrange for that potential replacement algorithm to become the current algorithm.

4. The system of claim 3, wherein the at least one potential replacement algorithm executes in the shadow environment based on at least one of: (i) historical data associated with the real environment, and (ii) a substantially real-time stream of information from the real environment.

5. The system of claim 3, wherein a plurality of algorithm components are automatically combined to create a potential replacement algorithm.

6. The system of claim 5, wherein the combination is based at least in part on the algorithm execution context information.

7. The system of claim 3, wherein the at least one selection criterion associated with the current algorithm executing in the real environment comprises at least one of: (i) an input type, (ii) an input format, (iii) an output type, (iv) an output format, and (v) a resource requirement.

8. The system of claim 3, wherein to compare performances is based on at least one of: (i) an accuracy, (ii) a precision, and (iii) a level of confidence.

9. The system of claim 1, wherein the information about the set of available algorithms comprises metadata including at least one of: (i) an identifier, (ii) a description, (iii) an implementation type, (iv) a version, (v) input data, (vi) output data, (vii) a resource requirement, (viii) context information, (ix) historical performance data, (x) an author, (xi) compliance information, and (xii) license information.

10. The system of claim 1, wherein the algorithm execution context information is associated with at least one of: (i) a geographic location, (ii) a weather condition, (iii) a time of day, (iv) another algorithm, (v) a cloud edge environment, (vi) historical data, and (vii) hardware.

11. The system of claim 1, wherein the algorithm execution context information is determined based at least in part on: (i) a priori information, (ii) a deep learning model, (iii) a sparse learning technique, (iv) a directly measured value, (v) an inferred value, and (vi) a genetic algorithm.

12. The system of claim 1, wherein multiple types of algorithm execution context information are determined.

13. A method associated with a real environment executing a current algorithm, the method comprising:
  accessing, by an algorithm selection platform, information about a set of available algorithms from an available algorithm data store;
  processing the current algorithm executing in the real environment to identify one or more parts of the current algorithm;
  labeling each of the one or more parts with metadata describing a function of the respective part;
  defining, based on an analysis of the metadata associated with the current algorithm executing in the real environment, at least one selection criteria for selection of at least one of the set of available algorithms;
  filtering the set of available algorithms into a subset of available algorithms using the at least one selection criterion;
  determining a context for algorithm execution context information;
  measuring and evaluating each of the subset of available algorithms with respect to the context and the metadata to select at least one of the subset of available algorithms as a potential replacement algorithm; and
  transmitting an indication of the selected at least one potential replacement algorithm.

14. The method of claim 13, further comprising:
  receiving, by an algorithm evaluation platform, the indication of the at least one potential replacement algorithm;
  arranging for the at least one potential replacement algorithm to execute in a shadow environment; and
  comparing performance of the at least one potential replacement algorithm with performance of the current algorithm in the real environment.

15. The method of claim 14, further comprising:
  when the performance of a potential replacement algorithm exceeds performance of the current algorithm in the real environment, arranging for that potential replacement algorithm to become the current algorithm.

16. The system of claim 15, wherein the at least one potential replacement algorithm executes in the shadow environment based on at least one of: (i) historical data associated with the real environment, and (ii) a substantially real-time stream of information from the real environment.

17. The system of claim 15, wherein a plurality of algorithm components are automatically combined to create a potential replacement algorithm.

18. A non-transitory, computer-readable medium storing instructions, which, when executed, cause, a processor to:
- access information about a set of available algorithms from an available algorithm data store;
- process a current algorithm executing in a real environment to identify one or more parts of the current algorithm;
- label each of the one or more parts with metadata describing a function of the respective part;
- define, based on an analysis of the metadata associated with the current algorithm executing in the real environment, at least one selection criterion for selection of at least one of the set of available algorithms;
- filter the set of available algorithms into a subset of availabe algorithms using the at least one selection criterion;
- determine a context for algorithm execution context information;
- measure and evaluate each of the subset of available algorithms with respect to the context and the metadata to select at least one of the set of available algorithms as a potential replacement algorithm; and
- transmit an indication of the selected at least one potential replacement algorithm.

19. The medium of claim 18, wherein the information about the set of available algorithms comprises metadata including at least one of: (i) an identifier, (ii) a description, (iii) an implementation type, (iv) a version, (v) input data, (vi) output data, (vii) a resource requirement, (viii) context information, (ix) historical performance data, (x) an author, (xi) compliance information, and (xii) license information.

20. The medium of claim 18, wherein the algorithm execution context information is associated with at least one of: (i) a geographic location, (ii) a weather condition, (iii) a time of day, (iv) another algorithm, (v) a cloud edge environment, (vi) historical data, and (vii) hardware.

21. The medium of claim 18, wherein the algorithm execution context information is determined based at least in part on: (i) a priori information, (ii) a deep learning model, (iii) a sparse learning technique, (iv) a directly measured value, (v) an inferred value, and (vi) a genetic algorithm.

\* \* \* \* \*